(12) United States Patent
Arakawa et al.

(10) Patent No.: US 9,707,507 B2
(45) Date of Patent: Jul. 18, 2017

(54) OIL REMOVING DEVICE AND AMMONIA PURIFICATION APPARATUS USING THE SAME

(71) Applicant: JAPAN PIONICS CO., LTD., Hiratsuka-shi, Kanagawa (JP)

(72) Inventors: Satoshi Arakawa, Hiratsuka (JP); Toshio Akiyama, Atsugi (JP); Koichi Yada, Atsugi (JP); Atsuya Makita, Ebina (JP)

(73) Assignee: JAPAN PIONICS CO., LTD., Kanagawa (JP)

( * ) Notice: Subject to any disclaimer, the term of this patent is extended or adjusted under 35 U.S.C. 154(b) by 113 days.

(21) Appl. No.: 14/735,650

(22) Filed: Jun. 10, 2015

(65) Prior Publication Data
US 2016/0339377 A1 Nov. 24, 2016

(30) Foreign Application Priority Data
May 22, 2015 (JP) .................................. 2015-104184

(51) Int. Cl.
*B01D 53/04* (2006.01)
*B01D 46/00* (2006.01)
(Continued)

(52) U.S. Cl.
CPC ......... *B01D 53/04* (2013.01); *B01D 46/0036* (2013.01); *B01D 46/521* (2013.01);
(Continued)

(58) Field of Classification Search
CPC .. B01D 50/002; B01D 53/04; B01D 46/0036; B01D 46/5241; B01D 46/543;
(Continued)

(56) References Cited

U.S. PATENT DOCUMENTS 3,252,270 A * 5/1966 Pall .................... B01D 46/24
  210/266
3,850,598 A * 11/1974 Boehm ................ F04D 29/056
  392/373
(Continued)

FOREIGN PATENT DOCUMENTS

JP   H06107412 A   4/1994
JP   2002037624 A   2/2002
(Continued)

*Primary Examiner* — Christopher P Jones
(74) *Attorney, Agent, or Firm* — Fitch, Even, Tabin & Flannery, LLP (57) ABSTRACT

The present invention provides ammonia purification means to remove impurities such as oil with a negative effect on vapor deposition from inexpensive commercially available industrial crude ammonia and from crude ammonia recovered from the gallium nitride compound semiconductor process and to continuously supply the purified ammonia to the gallium nitride compound semiconductor process. The oil removing device removing oil from crude ammonia containing oil as impurities includes an oil filter cylinder accommodating a filtration element cylindrically formed from a filtration membrane processed into a shape of pleat, honeycomb, or space structure; and an oil adsorption cylinder filled with activated carbon. The ammonia purification apparatus is provided with the oil removing device; a catalyst cylinder filled with a catalyst containing nickel as an active component; and an adsorption cylinder filled with synthetic zeolite.

9 Claims, 7 Drawing Sheets (51) Int. Cl.
*B01D 46/54* (2006.01)
*B01D 46/52* (2006.01)

(52) U.S. Cl.
CPC ...... *B01D 46/543* (2013.01); *B01D 2253/102* (2013.01); *B01D 2253/108* (2013.01); *B01D 2253/1122* (2013.01); *B01D 2257/702* (2013.01)

(58) Field of Classification Search
CPC ........ B01D 2253/102; B01D 2253/108; B01D 2253/1122; B01D 2257/702
See application file for complete search history.

(56) References Cited

U.S. PATENT DOCUMENTS

| | | | | |
|---|---|---|---|---|
| 4,130,487 A | * | 12/1978 | Hunter | B01D 27/06 210/259 |
| 2011/0138757 A1 | * | 6/2011 | Chen | B01D 45/14 55/317 |

FOREIGN PATENT DOCUMENTS

| | | | |
|---|---|---|---|
| JP | 2008007378 A | 1/2008 |
| JP | 5124813 A | 1/2013 |
| JP | 2013245131 A | 12/2013 |
| JP | 2014005181 A | 1/2014 |
| JP | 2014037333 A | 2/2014 |
| JP | 2014062815 A | 4/2014 |

* cited by examiner

OIL REMOVING DEVICE AND AMMONIA PURIFICATION APPARATUS USING THE SAME

FIELD OF THE INVENTION

The present invention relates to an oil removing device removing oil from crude ammonia containing oil, etc. as impurities, which is used as the raw material of a gallium nitride compound semiconductor, and an ammonia purification apparatus using the same.

BACKGROUND OF THE INVENTION

A gallium nitride compound semiconductor is frequently used as devices such as light emitting diodes and laser diodes. The production process of a gallium nitride compound semiconductor (the gallium nitride compound semiconductor process) is typically conducted by vapor-growing a gallium nitride compound on a substrate such as a sapphire substrate through the MOCVD process. As source gas used for the gallium nitride compound semiconductor process, trimethylgallium, trimethylindium, and trimethylaluminum that contain a group III element and ammonia that contains a group V element are used.

Generally, commercially available industrial crude ammonia (industrial crude ammonia) contains hydrogen, nitrogen, oxygen, carbon dioxide, water, etc. Moreover, relatively highly pure ammonia is commercially available, which is obtained by further distilling or rectifying the crude ammonia or by diluting the crude ammonia with highly pure inert gas. However, the gallium nitride compound semiconductor process requires ultrapure ammonia as source material obtained by further purifying relatively highly pure ammonia obtained after industrial ammonia is distilled or rectified.

Conventionally, a method of purifying crude ammonia by using a nickel catalyst, etc. has been developed. For example, JP H05-124813 A and JP H06-107412 A disclose a method of continuously purifying crude ammonia, in which the crude ammonia is brought into contact with a catalyst containing nickel as the main component to remove impurities. Moreover, JP 2002-37624 A discloses a method of continuously purifying and supplying industrial crude ammonia to the gallium nitride compound semiconductor process, in which the crude ammonia is brought into contact with a catalyst containing nickel as an active component and then with synthetic zeolite having a pore size equivalent to from 4 to 10 A to remove impurities contained in the crude ammonia.

On the other hand, JP 2008-7378 A discloses a method of recovering ammonia contained in discharge gas discharged from the gallium nitride compound semiconductor process, in which ammonia contained in the discharge gas is dissolved in water, and the aqueous ammonia in which ammonia is dissolved in water is distilled to separate ammonia from water, and the separated ammonia is liquefied. JP 2013-245131 A discloses a method of recovering ammonia, in which the discharge gas is subjected to a pressurizing process and a cooling process with a heat pump to liquefy and separate ammonia from hydrogen and nitrogen to recover ammonia.

Moreover, JP 2014-5181 A discloses a method of purifying ammonia, in which impurities causing an negative effect on the vapor deposition speed, etc. are removed from inexpensive commercially available industrial crude ammonia without distillation or rectification to continuously supply ammonia to the gallium nitride compound semiconductor process, in which the crude ammonia is brought into contact with a filter, with activated carbon to remove oil contained in the crude ammonia, and then with a catalyst containing nickel as an active component and with synthetic zeolite to remove the impurities other than oil.

JP 2014-37333 A also discloses a method of purifying ammonia, in which impurities causing an negative effect on the vapor deposition speed, etc., are removed from the inexpensive commercially available industrial crude ammonia without distillation or rectification to continuously supply ammonia to the gallium nitride compound semiconductor process, including the steps of: bringing the crude ammonia into contact with an oil removing means to remove oil contained in the crude ammonia, measuring the presence or the absence of oil or the concentration of oil in the crude ammonia after the oil removing step and bringing the crude ammonia after the measuring step into contact with a catalyst containing nickel as an active component and with synthetic zeolite to remove the impurities other than oil.

When conventional oil measurement is repeated, the oil sampling pipes have to be replaced at each measurement. This makes the operation complicated. Furthermore, accurate and delicate measurement is difficult due to an influence of impurities such as oil out of the tools when the oil sampling pipes are replaced. Then, JP 2014-62815 A discloses an oil measuring device and an oil measuring method that are capable of easy, accurate, and delicate measurement. The oil measuring device measures the amount of oil contained in ammonia gas, which is provided with an adsorption cylinder filled with an oil adsorbent and an analysis part analyzing oil desorbed from the adsorbent. The oil measuring method of measuring the amount of oil contained in ammonia gas includes the steps of bringing ammonia gas into contact with an adsorbent, adsorbing oil contained in ammonia gas to the adsorbent, desorbing oil adsorbed to the adsorbent, and analyzing the desorbed oil.

SUMMARY OF THE INVENTION

The method of purifying ammonia described in JP 2002-37624 A can continuously supply the inexpensive commercially available industrial crude ammonia to the gallium nitride compound semiconductor process without distillation or rectification. However, when industrial crude ammonia is purified only by the method of purifying ammonia described in JP 2002-37624 A to purify and supply ammonia to the gallium nitride compound semiconductor process, the vapor deposition speed of a gallium nitride compound deposited on the surface of a substrate is likely to slightly decrease compared with when ammonia is ultrapurified. Moreover, when ammonia recovered from the gallium nitride compound semiconductor process is used, the vapor deposition speed is likely to slightly decrease.

It is desirable to figure out why the vapor deposition speed of a gallium nitride compound decreases when purified ammonia obtained from the method of purifying ammonia and purified ammonia obtained from a method of recovering ammonia are used and then to develop a method of efficiently growing a gallium nitride compound on the surface of a substrate. An objective of the present invention is to provide an method of purifying ammonia to remove impurities such as oil with a negative effect on vapor deposition from inexpensive commercially available industrial crude ammonia and from crude ammonia recovered from the gallium nitride compound semiconductor process and then to continuously supply the purified ammonia to the gallium nitride compound semiconductor process.

As a result of their extensive studies to solve the above-mentioned problems, the inventors have revealed the following findings. (1) The process of manufacturing industrial ammonia synthesized from hydrogen and nitrogen and the process of recovering ammonia discharged from the nitride gallium compound semiconductor process perform gas compression. In the gas compression, oil (oil to improve the lubricity, the rust resistance, etc.) used for a compressor may be mixed with ammonia. (2) Even a small amount of oil may have a negative effect on the vapor deposition of a nitride gallium compound. (3) The oil contained in crude ammonia can be easily and efficiently removed by being brought into contact with a filtration membrane processed into a shape of pleat, honeycomb, or space structure and with activated carbon. Then, the inventors have achieved the oil removing device and the ammonia purification apparatus using the same of the present invention.

The present invention relates to an oil removing device removing oil from crude ammonia containing oil as impurities, including: an oil filter cylinder accommodating a filtration element cylindrically formed from a filtration membrane processed into a shape of pleat, honeycomb, or space structure; and an oil adsorption cylinder filled with activated carbon.

The present invention also relates to an ammonia purification apparatus removing impurities from crude ammonia containing one or more selected from oxygen, carbon dioxide, and water, and oil as the impurities, including: an oil filter cylinder accommodating a filtration element cylindrically formed from a filtration membrane processed into a shape of pleat, honeycomb, or space structure; an oil adsorption cylinder filled with activated carbon; an catalyst cylinder filled with a catalyst containing nickel as an active component; and an adsorption cylinder filled with synthetic zeolite.

The oil removing device and the ammonia purification apparatus of the present invention can remove impurities such as oil with a negative effect on the vapor deposition of a gallium nitride compound semiconductor from crude ammonia without distillation or rectification. Since the filtration membrane has a shape of pleat, honeycomb, or space structure, the oil removing device and the ammonia purification apparatus of the present invention have a high mechanical strength and a large contact area with crude ammonia to efficiently remove oil. As a result, inexpensive industrial crude ammonia and crude ammonia recovered from the gallium nitride compound semiconductor process can be continuously and effectively purified and supplied as source gas to the gallium nitride compound semiconductor process.

DETAILED DESCRIPTION OF THE INVENTION

The present invention is applied to an oil removing device removing oil from crude ammonia containing oil as impurities and an ammonia purification apparatus removing impurities from crude ammonia containing one or more selected from oxygen, carbon dioxide, and water, and oil as impurities.

The crude ammonia to be processed in the present invention is, for example, industrial commercially available crude ammonia synthesized from hydrogen and nitrogen under high-pressure reaction, and liquefied and filled in a gas cylinder, etc., or crude ammonia recovered from the gallium nitride compound semiconductor process.

The crude ammonia is recovered from the gallium nitride compound semiconductor process by, for example, contacting discharge gas discharged from the production process with water to dissolve ammonia contained in the discharge gas in water, distilling aqueous ammonia in which ammonia is dissolved in water to separate ammonia from water, and liquefying the separated ammonia, or by subjecting discharge gas discharged from the gallium nitride compound semiconductor process to a pressurizing process and a cooling process with a heat pump to liquefy and separate ammonia from hydrogen and nitrogen.

For example, commercially available crude ammonia stuffed in a gas cylinder, etc. ensures a purity of 99.9% or 99.99% but contains oil (oil to improve the lubricity, rust resistance, etc.) used for a compressor in gas compression as impurities other than oxygen, carbon dioxide, and water when produced. Even after the liquid ammonia is evaporated, the oil floats in the crude ammonia gas for a long term in the form of mist (oil mist with a diameter of mainly from about 0.01 to about 100 μm) and gas. The content of oil in crude ammonia is typically from 5 to 50 mg/m$^3$.

The oil removing device and the ammonia purification apparatus using the same of the present invention is described below in more detail with reference to FIGS. 1 to 14 but not limited thereto.

Figure 1:
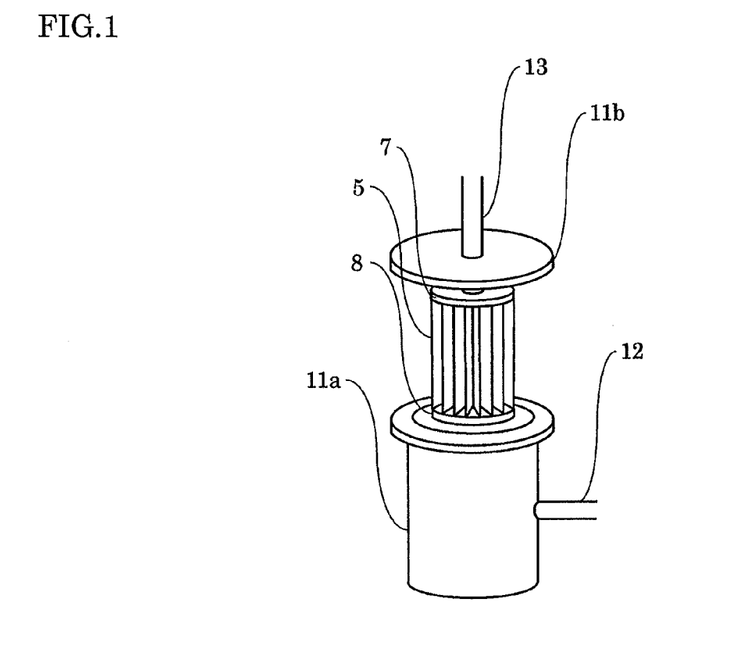
FIG. 1 shows a perspective view illustrating an example configuration of the oil filter cylinder used in the present invention.
Figure 2:
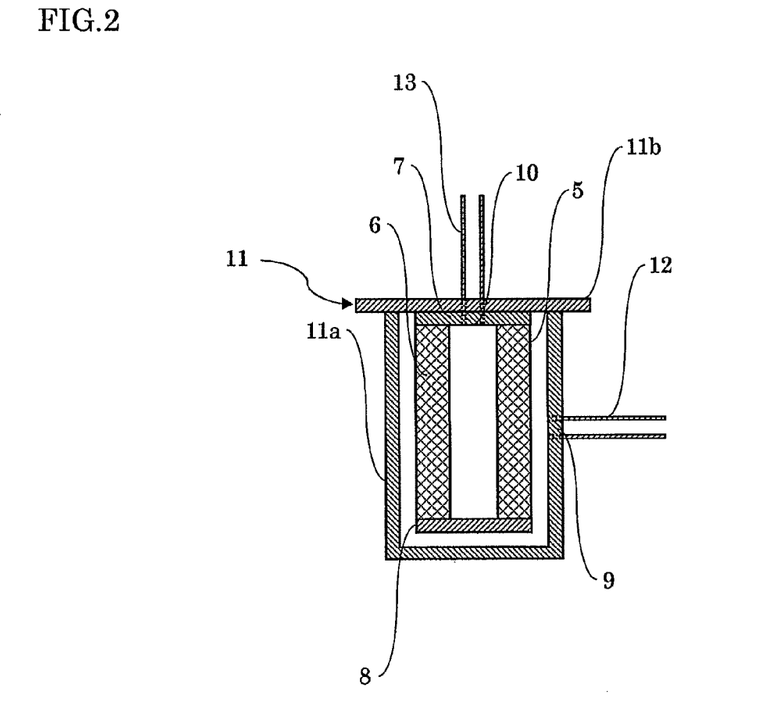
FIG. 2 shows a block diagram illustrating an example of the vertical section of the oil filter cylinder used in the present invention.
Figure 3:
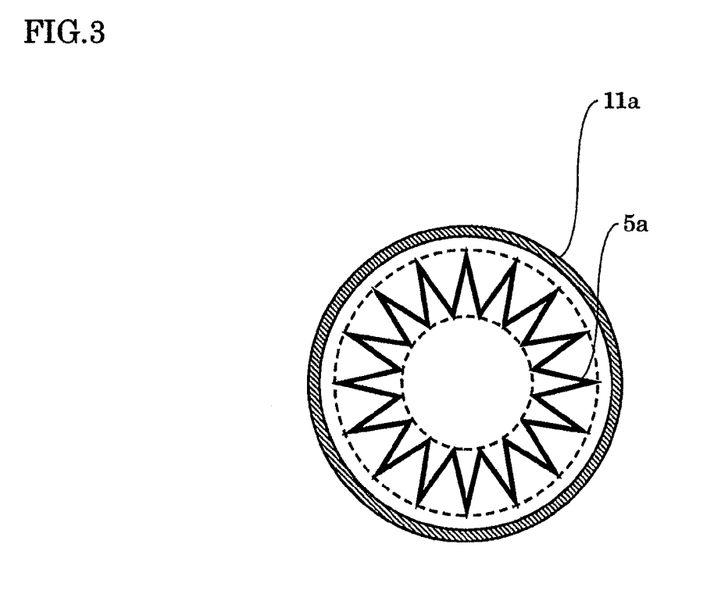
FIG. 3 shows a block diagram illustrating an example of the horizontal section of the oil filter cylinder used in the present invention.
Figure 5:
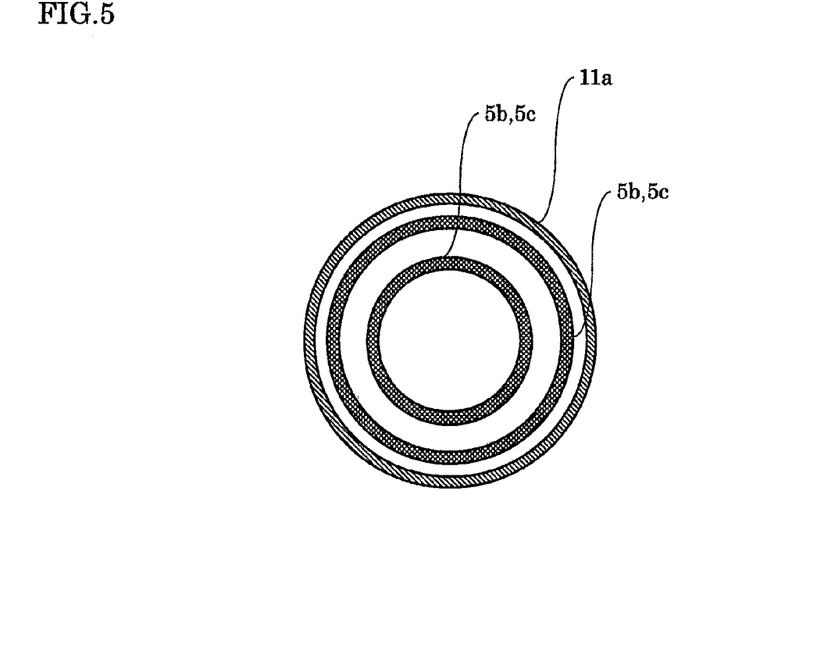
FIG. 5 shows a block diagram illustrating an example of the horizontal section of an oil filter cylinder used in the present invention but other than those of FIGS. 3 and 4.
Figure 6:
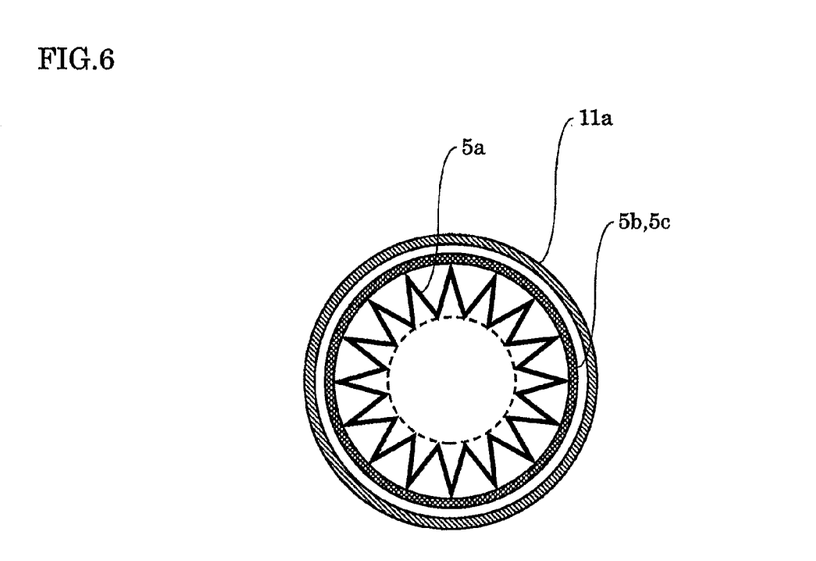
FIG. 6 shows a block diagram illustrating an example of the horizontal section of an oil filter cylinder used in the present invention but other than those of FIGS. 3 to 5.
Figure 7:
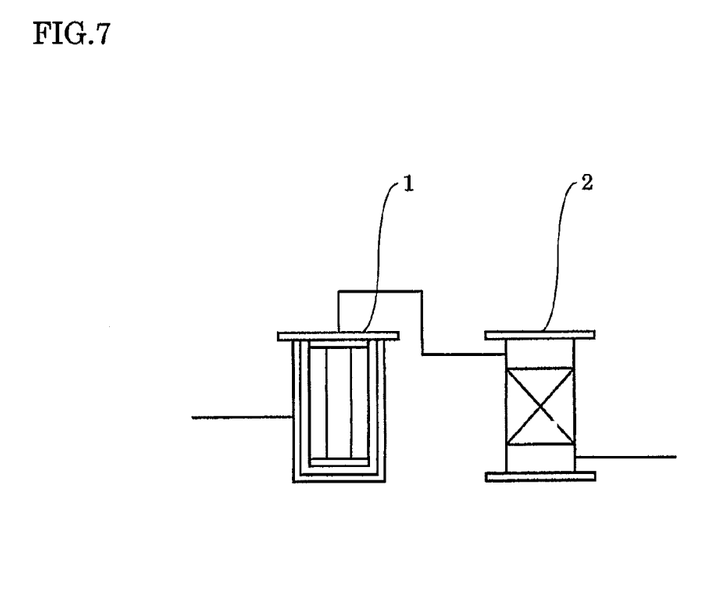
FIG. 7 shows a block diagram illustrating an example of the oil removing device of the present invention.
Figure 8:
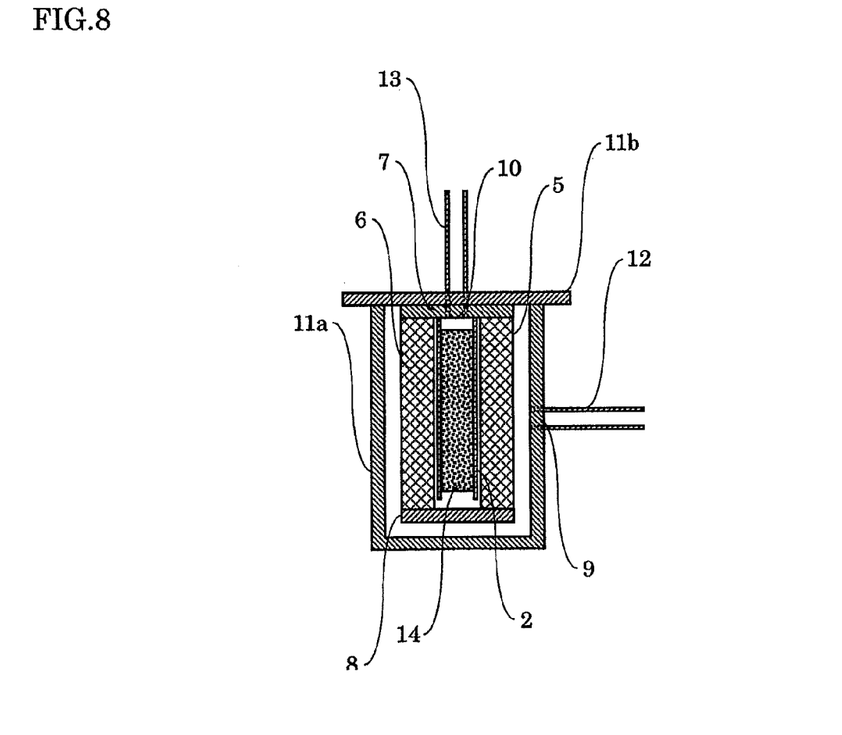
FIG. 8 shows a block diagram illustrating an example of the vertical section of the oil removing device of the present invention.
Figure 9:
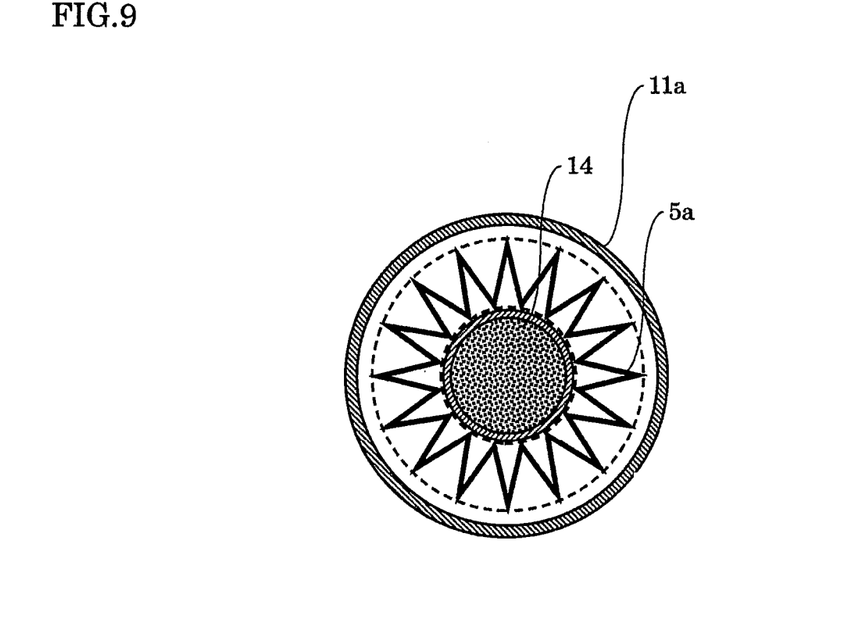
FIG. 9 shows a block diagram illustrating an example of the horizontal section of the oil removing device of the present invention.
Figure 10:
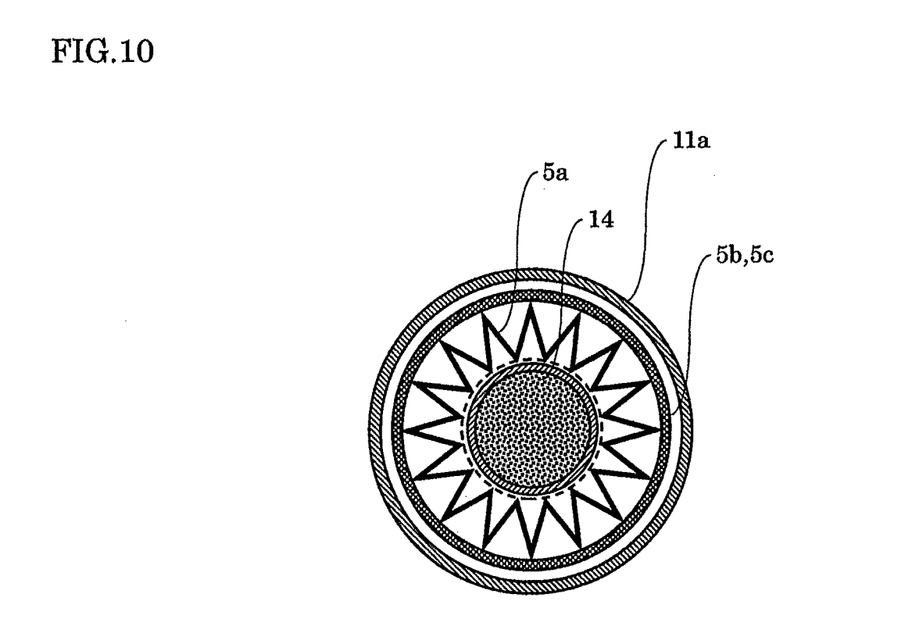
FIG. 10 shows a block diagram illustrating an example of the horizontal section of the oil removing device of the present invention but other than that of FIG. 9.
Figure 11:
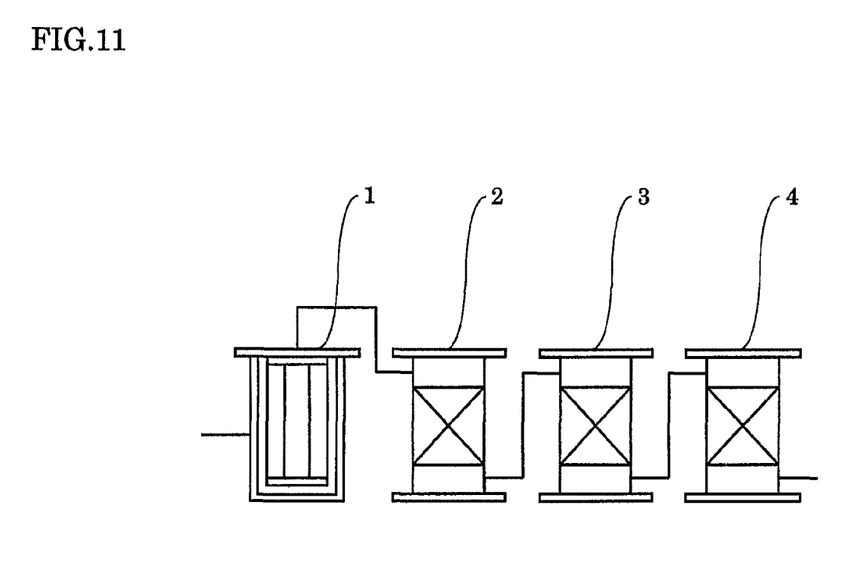
FIG. 11 shows a block diagram illustrating an example of the ammonia purification apparatus of the present invention.
Figure 12:
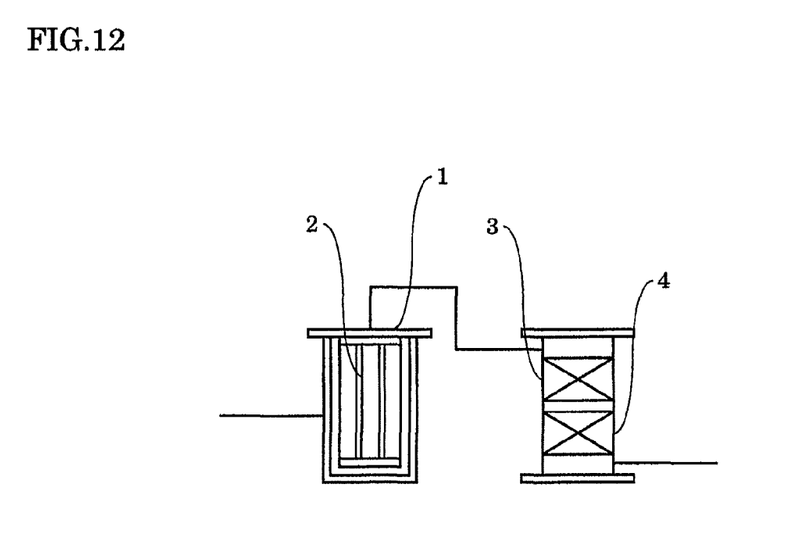
FIG. 12 shows a block diagram illustrating an example of the ammonia purification apparatus of the present invention but other than that of FIG. 11.
Figure 13:
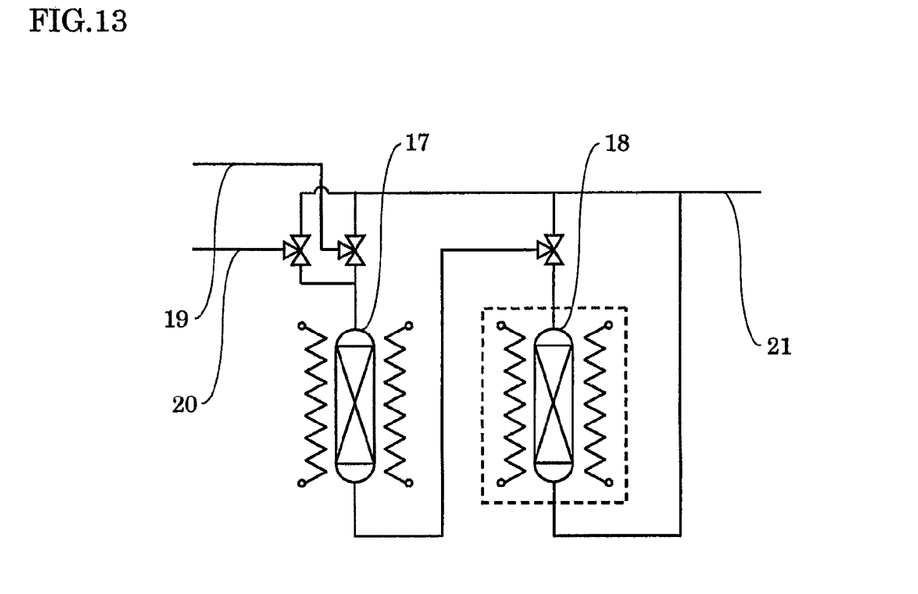
FIG. 13 shows a block diagram of the oil analyzer used in the present invention.
Figure 14:
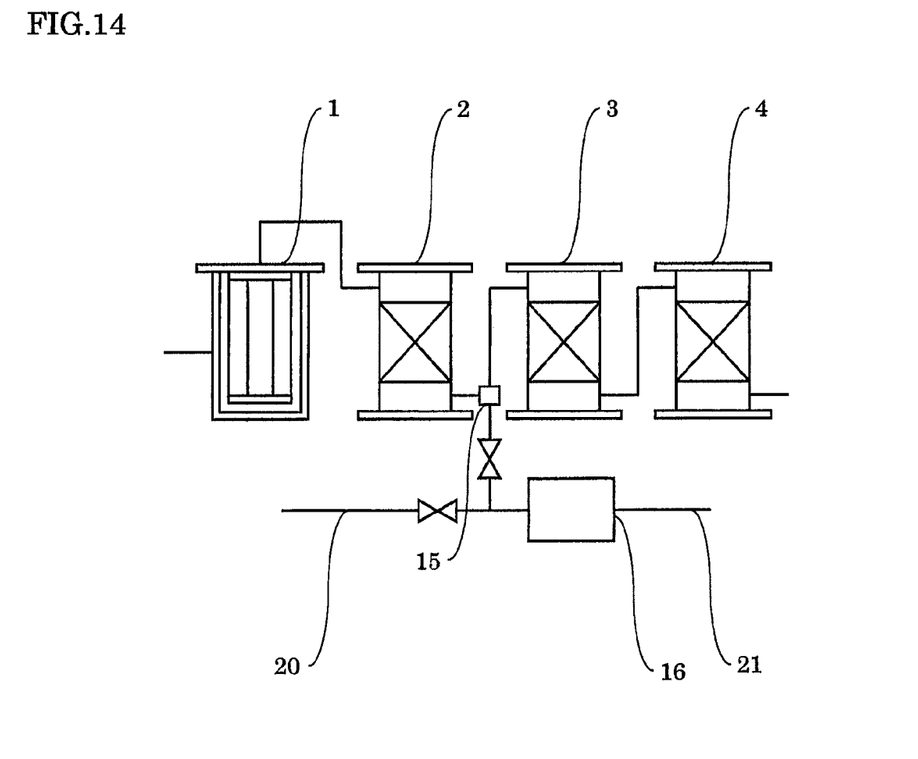
FIG. 14 shows a block diagram illustrating an example of the ammonia purification apparatus of the present invention provided with the oil analyzer.

FIG. 1 shows a perspective view illustrating an example configuration of the oil filter cylinder used in the present invention. FIG. 2 shows a block diagram illustrating an example of the vertical section of the oil filter cylinder used in the present invention. FIGS. 3 to 6 show block diagrams illustrating an example of the horizontal section of the oil filter cylinder used in the present invention. FIG. 7 shows a block diagram illustrating an example of the oil removing device of the present invention. FIG. 8 shows a block diagram illustrating an example of the vertical section of the oil removing device of the present invention. FIGS. 9 and 10 show block diagrams illustrating an example of the horizontal section of the oil removing device of the present invention. FIGS. 11 and 12 show block diagrams illustrating an example of the ammonia purification apparatus of the present invention. FIG. 13 shows a block diagram of the oil analyzer used in the present invention. FIG. 14 shows a block diagram illustrating an example of the ammonia purification apparatus of the present invention provided with the oil analyzer.

The oil removing device of the present invention removing oil from crude ammonia containing oil as impurities is provided with an oil filter cylinder 1 accommodating a filtration element cylindrically formed from a filtration membrane processed into a shape of pleat, honeycomb, or space structure, and an oil adsorption cylinder 2 filled with activated carbon as shown in FIG. 7. The oil removing device of the present invention may be provided with an oil adsorption cylinder 2 in the oil filter cylinder 1 as shown in FIG. 8.

The filtration element 5 used in the present invention is cylindrically formed from a filtration membrane 6 processed into a shape of pleat 5a, honeycomb 5b or space structure 5c as shown in FIGS. 1 to 6. To maintain the air tightness of the filtration element 5, fixing discs 7 and 8 are attached to the top and the bottom of the filtration element 5.

As shown in FIG. 2, a filtered gas outlet 10 is provided at the center of the fixing disc 7 at the top. The case 11 accommodating the filtration element 5 is composed of a case body 11a with a cylindrical exterior shape and a lid 11b. The case body 11a opens the top surface and has a crude ammonia inlet 9 in the side surface. The lid 11b is connected with an outlet pipe for filtered gas 13 at the center.

For the filtration element 5a cylindrically formed from a filtration membrane 6 processed into a shape of pleat, a flat filtration membrane is typically used. For the filtration element 5b cylindrically formed from a filtration membrane 6 processed into a shape of honeycomb, a rough filtration membrane and a fine filtration membrane are typically used outside and inside, respectively. In the present invention, the shape of honeycomb is not only regular hexagonal prisms but also solid figures are arranged without space. The filtration element 5c cylindrically formed from a filtration membrane 6 processed into a shape of space structure is, for example, formed from filtration membrane 6 with a patterned indented surface or provided with spaces such as pores extending to the inside.

Figure 4:
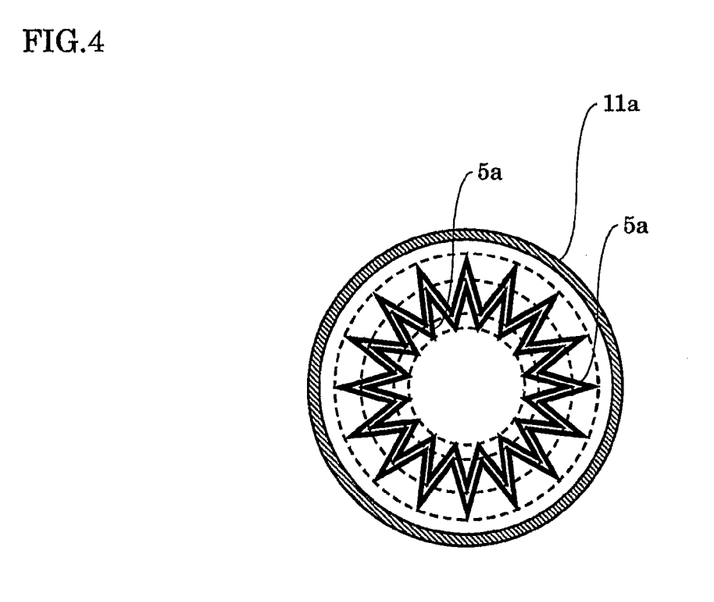
FIG. 4 shows a block diagram illustrating an example of the horizontal section of an oil filter cylinder used in the present invention but other than that of FIG. 3.

The constituent material of the filtration membrane 6 used in the present invention is not limited in particular as long as having corrosion resistance to ammonia and removing oil mist. As the constituent material of the filtration membrane 6, for example, ceramic fiber, glass fiber, metal fiber, etc. may be used. For the filtration membrane 6, a plurality of filtration elements 5 may be used as shown in FIGS. 4 and 5. In addition, for the filtration membrane 6, filtration elements with different structures may be used in a single device as shown in FIG. 6. When a plurality of filtration elements are used, a plurality of filtration membranes with different roughnesses are preferably provided to remove mist oil in order of decreasing the particle size.

The oil adsorption cylinder 2 provided in the downstream side of the oil filter cylinder 1 is filled with activated carbon. The activated carbon used in the present invention is not limited in particular as long as having corrosion resistance to ammonia and removing gaseous oil. For the activated carbon, for example, coconut shell charcoal, wood powder charcoal, peat charcoal, etc. may be used. The activated carbon preferably has a BET specific surface area of 500 $m^2/g$ or more. The filling length of activated carbon in the oil adsorption cylinder 2 is typically from 5 to 150 cm. Typically, in the activated carbon used in the present invention, inert gas such as nitrogen is previously introduced while being heated at 200° C. or less or inert gas heated to 200° C. or less is previously introduced to mainly remove the moisture, etc. contained in the activated carbon.

In the above-mentioned configuration, to downsize the entire device, the oil adsorption cylinder 2 may be provided in the cylindrical filtration element 5 of the filter cylinder 1 as shown in FIG. 8. In this case, for example, the oil adsorption cylinder 2 may be provided with an opening at the top and the bottom, to introduce gas that has passed through the filtration membrane 6 from the bottom and to discharge gas that has passed through the packed bed of activated carbon 14 from the top (gas outlet 10) as shown in FIG. 8. However, without the limitation to this, the oil adsorption cylinder 2 may be provided to introduce gas from the top and to discharge gas from the bottom or may be provided with a gas inlet and a gas outlet in the side surface of the cylinder.

The oil removing device of the present invention may be provided with an oil analyzer 16 as shown in FIG. 13 in the downstream side of the oil adsorption cylinder 2. In this case, as shown in FIG. 14, a sampling inlet 15 for oil analysis is provided in a pipe between the oil adsorption cylinder 2 and the catalyst cylinder 3 of the ammonia purification apparatus to be described later. The oil analyzer 16 is provided to prevent ammonia containing oil from flowing out to the downstream side because oil may be insufficiently removed due to the decreased capability of removing oil from crude ammonia as a result of using the oil filter cylinder 1 and the oil adsorption cylinder 2 for a long term. For example, the oil analyzer 16 may be provided with an adsorption part 17 filled with an oil adsorbent and an analysis part 18 analyzing oil desorbed from the adsorbent.

In the oil analyzer 16 of the present invention, gas to be analyzed is introduced from the inlet pipe for gas to be analyzed 19 to the adsorption part 17 at ordinary temperature to adsorb only the oil contained in the gas, gas to be analyzed is stopped to be introduced, the valves in the upstream side and in the downstream side of the adsorption part 17 are turned, the adsorbent is heated (at from 200 to 400° C.) while inert gases such as nitrogen, helium, and argon are being introduced from the inlet pipe for inert gas 20 to the adsorption part 17, to desorb oil from the adsorbent and introduce the desorbed oil to the analysis part 18, so as to measure the amount of oil. The adsorbent is not limited in particular as long as absorbing oil without being negatively-affected, for example, corroded by ammonia. Examples of the adsorbent include inorganic adsorbents such as activated alumina, diatomite, synthetic zeolite, and activated carbon, and a polymer adsorbent such as TENAX®. The adsorbent used in the present invention is particularly preferably TENAX® but not limited thereto.

The means to analyze oil in the analysis part 18 preferably has sensitivity to oil but substantially no sensitivity to ammonia. For example, this analysis means is preferably FID. When oil is desorbed from the adsorbent, a small amount of ammonia is also desorbed. However, with the above-mentioned analysis means, only oil can be measured in the analysis part 18. Inert gas with desorbed oil is introduced to the analysis part 18 to continuously desorb oil in the analysis part 18 until oil is not detected, so that the amount of oil that adsorbed to the adsorbent can be determined based on methane conversion. In the present invention, the amount of oil contained in the gas to be analyzed can be calculated from the amount of oil measured in the analysis part and the amount of gas to be analyzed that has introduced to the adsorbent. For example, the calculating formula is (Concentration of oil in ammonia [volppm])={(Amount of oil detected in analysis part [ml])/(Amount of ammonia introduced to adsorption part [ml])}×1,000,000 [volppm].

The ammonia purification apparatus of the present invention remove impurities from crude ammonia containing one or more selected from oxygen, carbon dioxide, and water, and oil as the impurities, include: an oil filter cylinder 1 accommodating a filtration element cylindrically formed from a filtration membrane processed into a shape of pleat, honeycomb, or space structure, an oil adsorption cylinder 2 filled with activated carbon, an catalyst cylinder 3 filled with a catalyst containing nickel as an active component; and an adsorption cylinder 4 filled with synthetic zeolite, as shown in FIG. 11. As shown in FIG. 12, in the ammonia purification apparatus of the present invention, the catalyst cylinder 3 filled with a catalyst containing nickel as an active component and the adsorption cylinder 4 filled with synthetic zeolite are filled in a single cylinder. For the oil filter cylinder 1 and the oil adsorption cylinder 2 filled with activated carbon, the same one used for the above-mentioned oil removing device may be used.

The catalyst containing nickel as an active component used in the present invention contains metal nickel or a nickel compound such as nickel oxide which is easily reduced, as the main component. A small amount of metals such as chrome, iron, cobalt, and copper may be contained as metal components other than the nickel. The nickel may be used alone or supported by a catalyst carrier, etc. However, the nickel is typically preferably supported on a catalyst carrier to improve the contact efficiency of the surface of the nickel with gas.

The BET specific surface area of the catalyst containing nickel as an active component is typically from 10 to 300 $m^2/g$, preferably from 30 to 250 $m^2/g$. The content of nickel in the whole catalyst is typically from 5 to 95 wt %, preferably from 20 to 95 wt %. If containing less than 5 wt % of nickel, the catalyst may decrease the oxygen eliminating ability. If containing more than 95 wt % of nickel, the catalyst may decrease the catalyst activity because sintering may occur during hydrogen reduction. The catalyst containing nickel as an active component is typically activated by hydrogen reduction before used. The hydrogen reduction is conducted by, for example, introducing the mixed gas of hydrogen and nitrogen to the catalyst at about 350° C. or less and at a linear velocity (LV) of about 5 cm/sec.

Chemically, the synthetic zeolite used in the present invention is a crystal form of synthetic hydrated sodium aluminosilicate in which a part of the sodium is substituted with potassium. This synthetic zeolite crystal has a number of pores with similar sizes inside. The synthetic zeolite typically formed into spherical shapes of from 4 to 20 mesh, or columnar shapes with a diameter of from 1.5 to 4 mm and a height of from 5 to 20 mm for its efficient use. In the present invention, the synthetic zeolite with a pore size equivalent to from 4 to 10 Å is preferably used. The synthetic zeolite is typically activated while inert gas is being aerated at from about 200 to about 350° C., before used.

In the oil removing device and the ammonia purification apparatus of the present invention, oil mist is mainly removed from crude ammonia by bring the crude ammonia into contact with the filtration element, and gaseous oil is mainly removed from crude ammonia by bring the crude ammonia into contact with the activated carbon. Moreover, oxygen and carbon dioxide are mainly removed from the crude ammonia from which oil is removed, by bring the crude ammonia into contact with a catalyst containing nickel as an active component, and carbon dioxide and water are mainly removed from the crude ammonia by bring the crude ammonia into contact with the synthetic zeolite.

The contact temperature of crude ammonia with the filtration element, the activated carbon, the catalyst containing nickel as an active component, and the synthetic zeolite is 100° C. or less but may typically be room temperature. For this contact, no heating or cooling is needed in particular. Moreover, the pressure is not limited in particular, which can be ordinary pressure, reduced pressure, or added pressure but typically ordinary pressure or 0.3 MPa. Moreover, the linear velocity (LV) of the crude ammonia in the respective packed beds of the activated carbon, the catalyst containing nickel as an active component, and the synthetic zeolite is typically 100 cm/sec or less, preferably 30 cm/sec or less.

Impurities selected from oxygen, carbon dioxide, and water contained in crude ammonia are not removed from the crude ammonia even after brought into contact with the filtration element. Even after brought into contact with the activated carbon, an extremely small amount of the impurities may be retained on the activated carbon and thus hardly removed from crude ammonia (Tendency of adsorption to activated carbon at ordinary temperature: gaseous oil>ammonia>carbon dioxide, etc.) If crude ammonia is not previously brought into contact with the filtration element, oil mist adheres to the surface of the activated carbon to prevent gaseous oil from being adsorbed more as time proceeds. In addition, if oil (oil mist and gaseous oil) is not previously removed from crude ammonia, oil cannot be removed with the catalyst containing nickel as an active component or the synthetic zeolite under typical conditions.

The present invention is described in more detail below with reference to the examples. However, these examples are only illustrative and not intended to limit the present invention

EXAMPLE 1

Production of Oil Filter Cylinder

A two-layered filtration element 5a (outside diameter: 150 mm, inside diameter: 100 mm, height: 200 mm, surface roughness of outside filtration membrane: enough to remove oil mist with diameter about 0.5 μm or more, surface roughness of inside filtration membrane: enough to remove oil mist with diameter about 0.01 μm or more) as shown in FIG. 4 was produced by cylindrically forming two filtration membranes processed into a shape of pleat. This filtration element 5a is fixed between a fixing disc 7 provided with a gas outlet 10 at the center and a fixing disc 8 to maintain the air tightness, and accommodated in a case body 11a (outside diameter: 200 mm, height: 250 mm) provided with a crude ammonia inlet 9 in the side surface. Then, a lid 11b of the case is attached in close contact with the top surface of the fixing disc 7 to produce an oil filter cylinder as shown in FIG. 2.

Production of Oil Removing Device

An oil adsorption cylinder 2 was produced by filling a stainless-steel cylinder (inside diameter: 80 mm, length: 180 mm) provided with a gas inlet and a gas outlet at the top and the bottom, respectively, with the activated carbon (BET specific surface area: about 1000 $m^2/g$) so that the filling length is 120 mm. This oil adsorption cylinder was accommodated in the filtration element 5a of the oil filter cylinder 1 to produce an oil removing device as shown in FIG. 8.

Then, a stainless-steel cylinder with an inside diameter of 3 mm and a length of 200 mm was filled with 0.4 g of TENAX® (filling length: 150 mm) as an adsorbent and equipped with a heater outside to produce an adsorption part 17. This adsorption part is connected to an analysis part 18 composed of FID to produce an oil analyzer 16 as shown in FIG. 13.

Oil Removal Test

A sampling inlet 15 was provided in the gas outlet 13 in the downstream side of the oil removing device and then connected to the oil analyzer 16. After pretreated by, for example, drying the activated carbon, industrial crude ammonia containing oil, oxygen, carbon dioxide, and water was introduced at ordinary temperature and pressure and at a flow rate of 10 L/min for 5 hours to conduct the oil removal test. Every 30 minutes during the test, ammonia was sampled from the sampling inlet 15 and analyzed with the oil analyzer 16, but no oil was detected. Moreover, the sampled ammonia was analyzed with a thermal conductivity detector (GC-TCD), a flame ionization detector (GC-FID), and a Fourier transform infrared spectrophotometer (FT-IR). As the result, the sampled ammonia contained 5 ppm of oxygen, 10 ppm of carbon dioxide, and 30 ppm of water as impurities.

The same as the crude ammonia described above was analyzed with the oil analyzer 16 without passing through the oil removing device. The sampled ammonia was confirmed to contain about 1 ppm of oil based on methane conversion. These results show that the oil removing device can sufficiently remove oil from industrial crude ammonia containing oil, oxygen, carbon dioxide, and water. However, the oil removing device could not sufficiently remove oxygen, carbon dioxide, and water.

EXAMPLE 2

Production of Oil Removing Device

Except for using the oil filter cylinder composed of filtration elements 5a and 5b as show in FIG. 10 and separating the oil filter cylinder 1 from the oil adsorption cylinder 2, an oil removing device as shown in FIG. 7 was produced in the same way as Example 1. The filtration element 5a was formed from a filtration membrane capable of removing oil mist with a diameter of about 0.01 μm or more. The filtration element 5b was formed from an outer filtration membrane capable of removing oil mist with a diameter of about 0.5 μm or more in the outside and an inner filtration membrane inside that is capable of removing oil mist with a diameter about 0.05 μm or more.

Production of Ammonia Purification Apparatus

The stainless-steel catalyst cylinder 3 was filled with a commercially available nickel catalyst. The stainless-steel adsorption cylinder 4 provided in the downstream side of the catalyst cylinder 3 was filled with a commercially available synthetic zeolite with a pore size equivalent to 4 Å. Then, the catalyst cylinder 3 and the adsorption cylinder 4 were installed in the downstream side of the oil removing device produced in the same way as Example 1. A sampling inlet 15 for the oil analysis was provided in the pipe between the oil adsorption cylinder 2 and the catalyst cylinder 3 and connected to the oil analyzer 16 to produce an ammonia purification apparatus as shown in FIG. 14.

Ammonia Purification Test

After pretreated by, for example, drying the activated carbon and activating the nickel catalyst and the synthetic zeolite, the same as the industrial crude ammonia used in Example 1 was introduced at ordinary temperature and pressure and at a flow rate of 10 L/min for 5 hours to conduct the ammonia purification test. Every 30 minutes during the test, ammonia was sampled from the sampling inlet 15 and analyzed with the oil analyzer 16, and purified ammonia obtained from the outlet of the adsorption cylinder 4 was also analyzed with a thermal conductivity detector (GC-TCD), a flame ionization detector (GC-FID), and a Fourier transform infrared spectrophotometer (FT-IR). As the result, no oil was detected from the ammonia sampled from the sampling inlet 15. No oxygen, carbon dioxide, or water was detected from the purified ammonia obtained from the outlet of the adsorption cylinder 4.

COMPARATIVE EXAMPLE 1

Except for not using the oil removing device, an ammonia purification apparatus was produced in the same way as Example 2.

After pretreated by, for example, activating the nickel catalyst and the synthetic zeolite, the same as the industrial crude ammonia used in Example 1 was introduced at ordinary temperature and pressure and at a flow rate of 10 L/min for 5 hours to conduct the ammonia purification test. Every 30 minutes during the test, purified ammonia obtained from the outlet of the adsorption cylinder 4 was analyzed with the oil analyzer 16. As the result, from about 0.1 to about 1 ppm of oil was determined based on methane conversion one hour after the test started.

INDUSTRIAL APPLICABILITY

As described above, the oil removing device and the ammonia purification apparatus of the present invention can efficiently remove oil from crude ammonia containing oil without distillation or rectification. As a result, inexpensive industrial crude ammonia and crude ammonia recovered from the gallium nitride compound semiconductor process can be continuously and effectively purified and supplied as a source gas to the gallium nitride compound semiconductor process.

REFERENCE SIGNS LIST

1 Oil filter cylinder
2 Oil adsorption cylinder
3 Catalyst cylinder
4 Adsorption cylinder
5 Filtration element
6 Filtration membrane
7 Fixing disc 8 Fixing disc
9 Crude ammonia inlet
10 Gas outlet
11 Case
12 Inlet pipe for crude ammonia
13 Outlet pipe for gas
14 Activated carbon
15 Sampling inlet
16 Oil analyzer
17 Adsorption part
18 Analysis part
19 Inlet pipe for gas to be analyzed
20 Inlet pipe for inert gas
21 Outlet pipe for analyzed gas

The invention claimed is:

1. An oil removing device removing oil from crude ammonia containing oil as impurities, comprising: an oil filter cylinder accommodating a filtration element cylindrically formed from a plurality of filtration membranes processed into a shape of pleat, honeycomb, or space structure; and an oil adsorption cylinder filled with activated carbon, wherein the plurality of filtration membranes comprises filtration membranes having different roughnesses to remove mist oil in order of decreasing particle size.

2. The oil removing device according to claim 1, wherein the oil adsorption cylinder is provided in the oil filter cylinder.

3. The oil removing device according to claim 1, wherein the crude ammonia is brought into contact with the filtration element to remove oil mist from the crude ammonia, and the crude ammonia is brought into contact with the activated carbon to remove gaseous oil from the crude ammonia.

4. The oil removing device according to claim 1, further comprising an analyzer provided in the downstream side of the oil adsorption cylinder configured to analyze the oil.

5. An ammonia purification apparatus removing impurities from crude ammonia containing one or more selected from oxygen, carbon dioxide, and water, and oil as the impurities, comprising: an oil filter cylinder accommodating a filtration element cylindrically formed from a filtration membrane processed into a shape of pleat, honeycomb, or space structure; an oil adsorption cylinder filled with activated carbon; a catalyst cylinder filled with a catalyst containing nickel as an active component; and an adsorption cylinder filled with synthetic zeolite.

6. The ammonia purification apparatus according to claim 5, further comprising an oil analyzer; and a sampling inlet provided in a pipe between the oil adsorption cylinder and the catalyst cylinder, the sampling inlet introducing gas to be analyzed in the oil analyzer.

7. The ammonia purification apparatus according to claim 5, wherein the crude ammonia is commercially available for industrial use.

8. An ammonia purification method using the ammonia purification apparatus according to claim 5, comprising recovering crude ammonia by bringing discharge gas discharged from a gallium nitride compound semiconductor apparatus into contact with water to dissolve ammonia contained in the discharge gas in water, distilling aqueous ammonia in which ammonia is dissolved in water to separate ammonia from water, and liquefying the separated ammonia to provide recovered crude ammonia, and feeding the recovered crude ammonia to the ammonia purification apparatus.

9. An ammonia purification method using the ammonia purification apparatus according to claim 5, comprising recovering crude ammonia by subjecting discharge gas discharged from the gallium nitride compound semiconductor apparatus to a pressurizing process and a cooling process with a heat pump to liquefy and separate ammonia from hydrogen and nitrogen to provide recovered crude ammonia, and feeding the recovered crude ammonia to the ammonia purification apparatus.

* * * * *